United States Patent
Sallam

(10) Patent No.: US 7,509,680 B1
(45) Date of Patent: Mar. 24, 2009

(54) DETECTING COMPUTER WORMS AS THEY ARRIVE AT LOCAL COMPUTERS THROUGH OPEN NETWORK SHARES

(75) Inventor: Ahmed Sallam, Los Angeles, CA (US)

(73) Assignee: Symantec Corporation, Cupertino, CA (US)

(*) Notice: Subject to any disclaimer, the term of this patent is extended or adjusted under 35 U.S.C. 154(b) by 898 days.

(21) Appl. No.: 10/932,609

(22) Filed: Sep. 1, 2004

(51) Int. Cl.
*G06F 21/00* (2006.01)
*G06F 15/16* (2006.01)
*G06F 11/30* (2006.01)

(52) U.S. Cl. ......................................... 726/24; 709/224
(58) Field of Classification Search ................... None
See application file for complete search history.

(56) References Cited

U.S. PATENT DOCUMENTS

| | | |
|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,398,196 A | 3/1995 | Chambers |
| 5,432,851 A | 7/1995 | Scheidt et al. |
| 5,450,576 A | 9/1995 | Kennedy |
| 5,452,442 A | 9/1995 | Kephart |
| 5,495,607 A | 2/1996 | Pisello et al. |
| 5,530,757 A | 6/1996 | Krawczyk |
| 5,548,532 A | 8/1996 | Menand et al. |
| 5,564,054 A | 10/1996 | Bramnick et al. |
| 5,572,590 A | 11/1996 | Chess |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |

(Continued)

FOREIGN PATENT DOCUMENTS

EP          0636977 A2    2/1995

(Continued)

OTHER PUBLICATIONS

Richter, J., Microsoft.com web pages (online), "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner*—Christopher A Revak
(74) *Attorney, Agent, or Firm*—Fenwick & West LLP

(57) ABSTRACT

A worm detection manager detects computer worms when they arrive at target computers via open network shares. The worm detection manager monitors incoming file system traffic, and determines the source of incoming files. The worm detection manager determines that an incoming file is infected with a worm, responsive to circumstances such as substantially the same file being written to the target computer by a requisite plurality of computers; substantially the same file being written to the target computer a requisite number of times by the same computer; substantially the same file being written to the target computer a requisite number of times within a requisite time period; and substantially the same file being written to the target computer through a requisite number of open shares.

24 Claims, 2 Drawing Sheets

U.S. PATENT DOCUMENTS

| | | | |
|---|---|---|---|
| 5,675,710 A | 10/1997 | Lewis | |
| 5,694,569 A | 12/1997 | Fischer | |
| 5,708,776 A | 1/1998 | Kikinis | |
| 5,765,151 A | 6/1998 | Senator | |
| 5,799,088 A | 8/1998 | Raike | |
| 5,802,080 A | 9/1998 | Westby | |
| 5,826,249 A | 10/1998 | Skeirik | |
| 5,832,208 A | 11/1998 | Chen et al. | |
| 5,832,527 A | 11/1998 | Kawaguchi | |
| 5,854,759 A | 12/1998 | Kaliski, Jr. et al. | |
| 5,854,916 A | 12/1998 | Nachenberg | |
| 5,884,033 A | 3/1999 | Duvall et al. | |
| 5,922,072 A | 7/1999 | Hutchinson et al. | |
| 5,944,821 A | 8/1999 | Angelo | |
| 5,956,475 A | 9/1999 | Burckhartt et al. | |
| 5,974,546 A | 10/1999 | Anderson | |
| 5,974,549 A | 10/1999 | Golan | |
| 6,000,032 A | 12/1999 | Millard | |
| 6,006,242 A | 12/1999 | Poole et al. | |
| 6,014,744 A | 1/2000 | McKaughan et al. | |
| 6,014,767 A | 1/2000 | Glaise | |
| 6,021,510 A | 2/2000 | Nachenberg | |
| 6,023,723 A | 2/2000 | McCormick et al. | |
| 6,048,090 A | 4/2000 | Zook | |
| 6,061,788 A | 5/2000 | Reynaud et al. | |
| 6,072,942 A | 6/2000 | Stockwell et al. | |
| 6,079,016 A | 6/2000 | Park | |
| 6,088,803 A | 7/2000 | Tso et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,167,434 A | 12/2000 | Pang | |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,401,210 B1* | 6/2002 | Templeton | 726/24 |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,701,440 B1* | 3/2004 | Kim et al. | 726/24 |
| 6,721,721 B1 | 4/2004 | Bates et al. | |
| 6,751,789 B1 | 6/2004 | Berry et al. | |
| 6,772,346 B1 | 8/2004 | Chess et al. | |
| 6,842,861 B1 | 1/2005 | Cox et al. | |
| 6,886,099 B1 | 4/2005 | Smithson et al. | |
| 6,944,555 B2 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 7,080,408 B1* | 7/2006 | Pak et al. | 726/24 |
| 7,299,361 B1* | 11/2007 | Kim et al. | 713/188 |
| 7,325,251 B1* | 1/2008 | Szor | 726/22 |
| 2002/0035693 A1 | 3/2002 | Eyres et al. | |
| 2002/0038308 A1 | 3/2002 | Cappi | |
| 2002/0046207 A1 | 4/2002 | Chino et al. | |
| 2002/0073046 A1 | 6/2002 | David | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0162015 A1* | 10/2002 | Tang | 713/200 |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023875 A1 | 1/2003 | Hursey et al. | |
| 2003/0033587 A1 | 2/2003 | Ferguson et al. | |
| 2003/0061287 A1 | 3/2003 | Yu et al. | |
| 2003/0065926 A1 | 4/2003 | Schultz et al. | |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0154394 A1 | 8/2003 | Levin | |
| 2003/0167402 A1* | 9/2003 | Stolfo et al. | 713/200 |
| 2003/0233352 A1 | 12/2003 | Baker | |
| 2004/0015554 A1 | 1/2004 | Wilson | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0158741 A1* | 8/2004 | Schneider | 713/201 |
| 2004/0172551 A1* | 9/2004 | Fielding et al. | 713/200 |
| 2004/0220975 A1 | 11/2004 | Carpentier et al. | |
| 2005/0039082 A1* | 2/2005 | Nachenberg | 714/38 |
| 2006/0080737 A1* | 4/2006 | Freeman et al. | 726/24 |
| 2006/0272021 A1* | 11/2006 | Marinescu et al. | 726/24 |
| 2007/0136808 A1* | 6/2007 | Xiong | 726/22 |

FOREIGN PATENT DOCUMENTS

| | | | |
|---|---|---|---|
| EP | 0858031 A1 | 8/1998 | |
| EP | 1408393 A2 | 4/2004 | |
| WO | WO 93/25024 A1 | 12/1993 | |
| WO | WO 95/15522 A1 | 6/1995 | |
| WO | WO 95/22794 A1 | 8/1995 | |
| WO | WO 99/15966 A1 | 4/1999 | |
| WO | WO 00/28420 A2 | 5/2000 | |
| WO | WO 02/33525 A2 | 4/2002 | |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Burchell, Jonathan, "NetShield 1.5", Virus Bulletin, Aug. 1994, pp. 21-23, XP 000617453.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipeida.org.web pages [online], Wikipedia, [retrieved Mar. 17, 2003] Retrieved from the Internet: <URL: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique with Memory Address Confirmation", Lecture Notes in Computer Science 2288, 2002, pp. 146-159, Spinger-Verlag, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide", McAfee Associates, Inc., issued Mar. 1997, pp. 1-60.

"Norton Utilities for Windows User's Guide—Version 2.0", Symantec, 1995.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

* cited by examiner

DETECTING COMPUTER WORMS AS THEY ARRIVE AT LOCAL COMPUTERS THROUGH OPEN NETWORK SHARES

TECHNICAL FIELD

This invention pertains generally to computer operating system internals, and more specifically to utilizing a detected correlation between network traffic and its corresponding file input/output activity to detect computer worms as they arrive at local computers via open network shares.

RELATED APPLICATIONS

This patent application is related to U.S. patent application Ser. No. 10/902,229, filed on Jul. 28, 2004, titled "Lightweight Hooking Mechanism for Kernel Level Operations," and having the same assignee (the Lightweight Hooking Mechanism application). The Lightweight Hooking Mechanism application is hereby incorporated by reference in its entirety. This patent application is also related to U.S. patent application Ser. No. 10/927,295, filed on Aug. 25, 2004, titled "Correlating Network Traffic with its Corresponding File Input/Output Activity," and having the same assignee (the Network Traffic Correlating application). The Network Traffic Correlating application is hereby incorporated by reference in its entirety.

BACKGROUND

Computer worms are one of the most challenging problems facing computer security researchers today. The value of a computer network is a function of its speed and the number of connected computers making up the network. However, both fast and large networks enable computer worms to propagate very rapidly.

Computer worms like W32.SoBig.F, W32.Nimda, W32.Sircam and W32.Datom enumerate the network shares to which their local computer has write access, and then either copy themselves over those writable network shares or infect executable files located on the corresponding remote, writable network locations.

Computer researchers have identified some useful worm management techniques that focus on the behavioral analysis of computer worms when they propagate through open writable network shares. One such technique uses a behavioral based blocking method of comparing the content of a binary file copied to a remote network share with the content of the copying program, when the copying program itself has arrived through an open network share.

Most research effort has focused on the behavioral analysis of worms at the source computer while they propagate through open network shares. There has been almost no effort focused on analyzing the behavior of worms at the target computer to which the worms are copied. In Microsoft Windows NT®, remote clients can read and write to files across the network. Microsoft's srv.sys is a kernel level operating system component that provides an interface between remotely initiated file input/output requests and the local file system. As such, srv.sys is not itself a file system, but rather a fileserver. Unfortunately, srv.sys provides very little information concerning the source computer that initiated a local file write operation. Therefore, it has not been practicable for researchers to provide worm management solutions based on analyzing worm behavior on the target computer.

However, worm analysis at a source computer can be potentially problematic. For instance, analyzing a worm at the source computer requires the worm to be active and running, and therefore to already have control of the local software environment. Thus, the worm being analyzed can damage both the local and the network computer resources. Moreover, the worm will have the ability to fight any security software installed on the local computer.

In addition, a user of the source computer generally has to take some sort of action in order to activate the worm in the first place. For instance, the user might activate the worm by opening an executable attachment to an e-mail, or by clicking on a worm file located in one of the user's folders. Thus, source computer worm blocking techniques require action on a user's part.

What is needed are methods, systems and computer readable media for detecting worms when they arrive at target computers via open network shares.

SUMMARY OF INVENTION

An embodiment of the present invention detects computer worms when they arrive at target computers via open network shares. A worm detection manager monitors file system traffic written to a local computer through open shares, and determines the source of incoming files. The worm detection manager determines that an incoming file is infected with a worm, responsive to criteria such as substantially the same file being written to the target computer by a requisite plurality of source computers; substantially the same file being written to the target computer a requisite number of times by a same source computer; substantially the same file being written to the target computer a requisite number of times within a requisite time period; substantially the same file being written to the target computer through a requisite number of open shares; and the incoming file exhibiting at least one substantially same suspicious characteristic as at least one other incoming file. Responsive to determining that a file is infected with a worm, the worm detection manager can delete the file, prevent the file from executing on the local computer, or quarantine the file.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
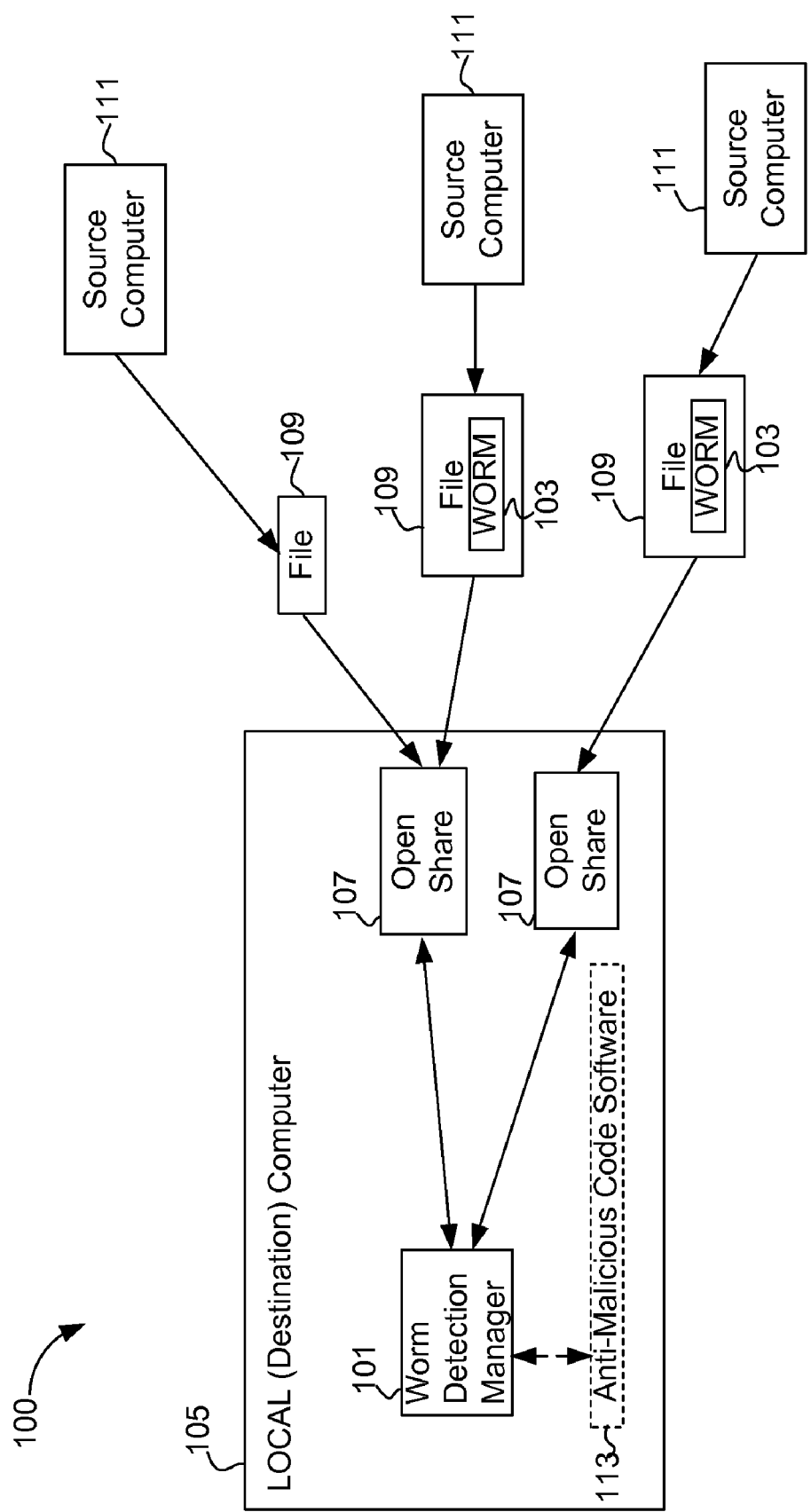
FIG. 1 is a block diagram illustrating a high level overview of a system for practicing some embodiments of the present invention.

FIG. 1 illustrates a high level overview of a system 100 for performing some embodiments of the present invention. A worm detection manager 101 detects worms 103 being copied to a local computer 105 through open network shares 107, by examining files 109 originating from remote source computers 111. It is to be understood that although the worm detection manager 101 is illustrated as a single entity, as the term is used herein a worm detection manager 101 refers to a collection of functionalities which can be implemented as software, hardware, firmware or any combination. Where a worm detection manager 101 is implemented as software, it can be implemented as a standalone program, but can also be implemented in other ways, for example as part of a larger program, as a plurality of separate programs, as one or more device drivers or as one or more statically or dynamically linked libraries.

This specification describes performing some embodiments of the present invention within the context of a current Microsoft Windows NT® configuration (including versions of Windows based on NT, such as XP, 2000 and 2003). Thus, the names of system components and system functions used herein are those of the current version of Windows NT®. Of course, the present invention is not tied to Windows NT®, or to these names specifically, and in various embodiments of the present invention the described components can have other names as desired. For example, described system functions might have different names in future or different versions of Windows, all of which would be within the scope of the present invention.

Figure 2:
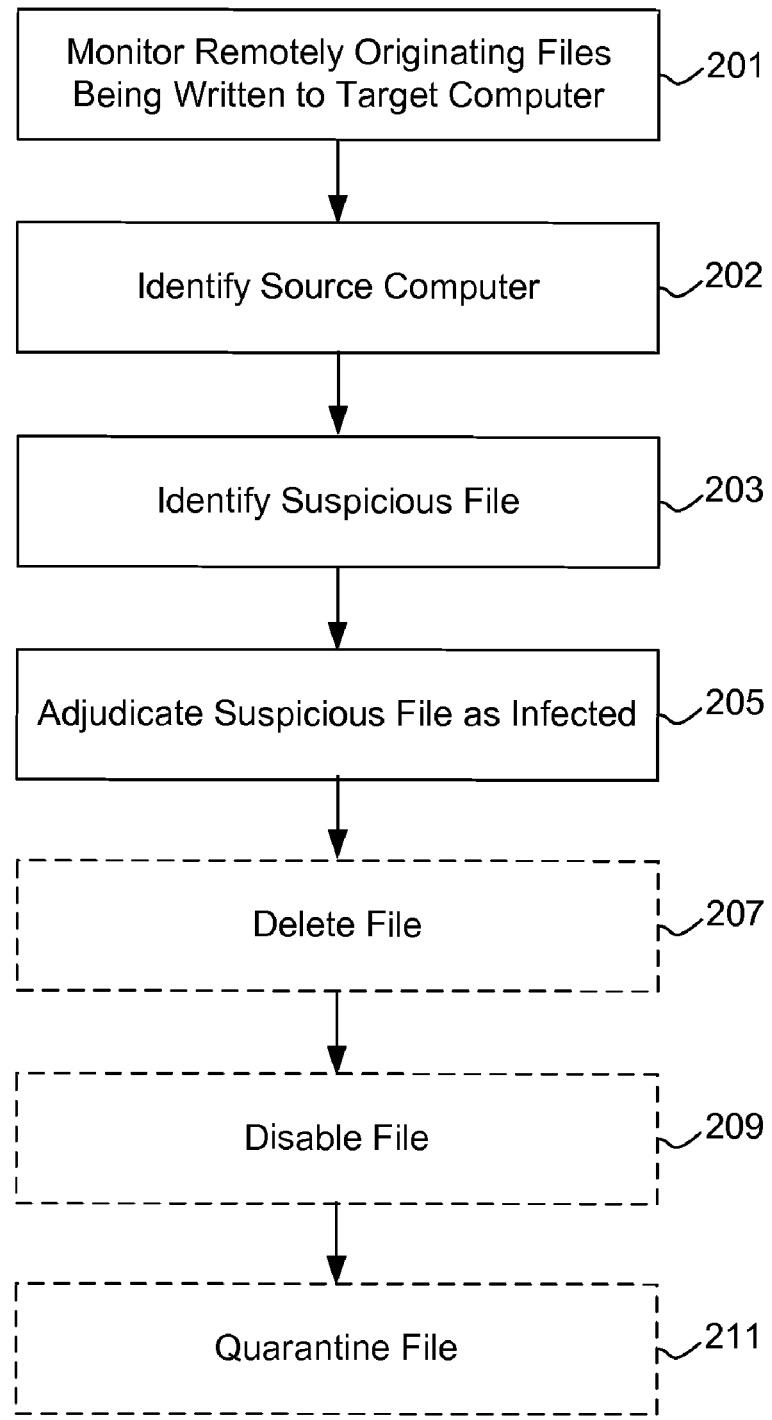
FIG. 2 is a flowchart illustrating steps for detecting worms as they arrive at a target computer, according to some embodiments of the present invention.

FIG. 2 illustrates steps for detecting worms 103 as they arrive at a target computer, according to some embodiments of the present invention. The worm detection manager 101 monitors 201 remotely originating files 109 being written to the local (target) computer 105 through open shares 107. When a file 109 is written to the target computer 105 through an open share 107, the worm detection manager 101 uses techniques disclosed in the Network Traffic Correlation application to identify 202 the source computer 111 that wrote the file 109. Using the Network Traffic Correlation methodology, the worm detection manager 101 correlates the writing of the file 109 to the target computer 105 through the open network share 107 (using the SMB/CIFS protocol) with the source computer 111 from which the file 109 originated. By using such techniques, the worm detection manager 101 can glean identifying information concerning the source computer 111 such as its IP address or alphanumeric name.

By monitoring 201 file system traffic entering the target computer 105 through open network shares 107, the worm detection manager 101 is able to identify 203 suspicious files 109 and adjudicate 205 those files 109 as being infected with a worm 103. In various embodiments, different criteria can be applied to determine which files 109 are to be considered infected, depending upon the level of security desired and the tolerance level for false positives. In one embodiment, the worm detection manager 101 compares the contents of incoming files 109, looking for suspicious levels of similarity. Fast propagating worms 103 tend to repeatedly and quickly copy themselves to vulnerable computers, so the same file 109 being copied to the target computer 105 numerous times within a relatively short time period is indicative of the file 109 being infected. In various embodiments, some or all of the following types of circumstances can be used by the worm detection manager 101 to identify an incoming file 109 as being infected with a worm 103: the same file 109 being copied to the target computer 105 from multiple source computers 111, the same file 109 being repeatedly copied to the target computer 105 from the same source computer 111, the same file 109 being repeatedly copied to the target computer 105 within a requisite time period and same file 109 being repeatedly copied to the target computer 105 through multiple open shares 107.

Specific worm 103 identification criteria, such as how many times the same file 109 needs to be copied to the target computer 105, how many different source computers 111 the file 109 needs to be copied from, the number of open shares 107 through which the file 109 must be copied and the length of the time period in which the copying must occur are variable design parameters. These criteria can be set and/or adjusted up and/or down as desired, depending upon the specific level and form of protection desired.

The method that the worm detection manager 101 uses to compare the content of arriving files 109 is also a variable design parameter. This can be a byte to byte matching method that computes, for example, the MD5 hash value of every incoming file 109. At a more sophisticated level, the worm detection manager 101 can perform a thorough analysis of each incoming file 109 based on its format (e.g., portable executable file format), comparing different sections by format in the different incoming files 109. Additionally, how close files 109 have to be to be considered the same can vary from embodiment to embodiment as desired. Two files 109 need not be identical at a byte level to be considered to be substantially the same. For example, in one embodiment if two files 109 have a similar irregular byte pattern within a code section, the worm detection manager 101 will adjudicate them to be substantially the same for the purposes of worm 103 detection. The specific standards to use in making such an adjudication are a design choice.

Polymorphic worms 103 are known to modify themselves in order to avoid detection. Nonetheless, each modified version of a polymorphic worm 103 still contains a common malicious binary element. Therefore, in some embodiments, the worm detection manager 101 attempts to detect polymorphic worms 103 as they arrive at local computers 105 by performing a binary heuristic analysis on arriving files 103, and looking for common suspicious characteristics in multiple files 109 arriving from one or more sources. Responsive to an incoming file exhibiting at least one substantially same suspicious characteristic as at least one other incoming file, the worm detection manager 101 adjudicates the file 103 as being infected with a polymorphic worm 103. What specifically constitutes common suspicious characteristics can vary from embodiment to embodiment as desired. Various methods of performing heuristic file analysis are known to those of ordinary skill in the relevant art, and the usage thereof in this context will be apparent thereto in light of this specification.

As illustrated in FIG. 2, when the worm detection manager 101 identifies a file 109 as being infected with a worm 103, the worm detection manager 101 executes a response as desired. In one embodiment, the worm detection manager 101 deletes 207 the file 109. In another, the worm detection manager 101 disables 209 the file 109 from running on the local computer 105. In some instances, anti-malicious code software 113 is available to the target computer 105 (e.g., such software 113 is running thereon). In these cases, it is not unlikely that an identifying signature for the worm 103 will soon be available to the anti-malicious code software 113 (e.g., within a few hours), enabling the anti-malicious code software 113 to positively identify and clean files 109 infected with the worm 103.

So, in some embodiments, the worm detection manager 101 quarantines 211 files 109 identified as being infected, and provides the anti-malicious code software 113 with a list of quarantined files 109 for processing (e.g., scanning and cleaning). In other embodiments, the scanning and/or cleaning functionality is part of the worm detection manager 101 itself.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting a computer worm being written to a target computer, the method comprising the steps of:
    monitoring, by the target computer, files written to the target computer by a source computer through at least one open share providing the source computer with write access to the target computer; and
    determining, by the target computer, that an incoming file written to the target computer by the source computer through the at least one open share is infected with a worm, responsive to the incoming file being similar to a file previously written to the target computer.

2. The method of claim 1 further comprising:
    responsive to determining that the incoming file is infected with a worm, performing a step from a group of steps consisting of:
    deleting the incoming file;
    cleaning the incoming file;
    preventing the incoming file from executing on the target computer; and
    quarantining the incoming file.

3. The method of claim 2 further comprising:
    responsive to determining that the incoming file is infected with a worm, quarantining the incoming file; and
    providing identifying information concerning the quarantined file to anti-malicious code software for further processing.

4. The method of claim 1 further comprising:
    performing a binary heuristic analysis on the incoming file; and
    determining that the incoming file is infected with a polymorphic worm, responsive to the incoming file exhibiting at least one substantially same suspicious characteristic as at least one other file previously written to the target computer through the at least one open share.

5. The method of claim 4 further comprising:
    responsive to determining that the incoming file is infected with a polymorphic worm, performing a step from a group of steps consisting of:
    deleting the incoming file;
    cleaning the incoming file;
    preventing the incoming file from executing on the target computer; and
    quarantining the incoming file.

6. The method of claim 5 further comprising:
    responsive to determining that the incoming file is infected with a polymorphic worm, quarantining the incoming file; and
    providing identifying information concerning the quarantined file to anti-malicious code software for further processing.

7. The method of claim 1 wherein it is determined that the incoming file is infected with a worm in response to at least one circumstance from a group of circumstances consisting of:
    substantially the same file being written to the target computer by a requisite plurality of source computers;
    substantially the same file being written to the target computer a requisite number of times by a same source computer;
    substantially the same file being written to the target computer a requisite number of times within a requisite time period;
    substantially the same file being written to the target computer through a requisite number of open shares; and
    the incoming file exhibiting at least one substantially same suspicious characteristic as at least one other file previously written to the target computer through the at least one open share.

8. A computer readable medium containing a computer program product for detecting a computer worm being written to a target computer, the computer readable medium comprising:
    program code for monitoring, by the target computer, files written to the target computer by a source computer through at least one open share providing the source computer with write access to the target computer; and
    program code for determining, by the target computer, that an incoming file written to the target computer by the source computer through the at least one open share is infected with a worm, responsive to the incoming file being similar to a file previously written to the target computer.

9. The computer program product of claim 8 further comprising:
    program code for, responsive to determining that the incoming file is infected with a worm, performing a step from a group of steps consisting of:
    deleting the incoming file;
    cleaning the incoming file;
    preventing the incoming file from executing on the target computer; and
    quarantining the incoming file.

10. The computer program product of claim 9 further comprising:
    program code for, responsive to determining that the incoming file is infected with a worm, quarantining the incoming file; and program code for providing identifying information concerning the quarantined file to anti-malicious code software for further processing.

11. The computer program product of claim 8 further comprising:
program code for performing a binary heuristic analysis on the incoming file; and
program code for determining that the incoming file is infected with a polymorphic worm, responsive to the incoming file exhibiting at least one substantially same suspicious characteristic as at least one other file previously written to the target computer through the at least one open share.

12. The computer program product of claim 11 further comprising:
program code for, responsive to determining that the incoming file is infected with a polymorphic worm, performing a step from a group of steps consisting of:
deleting the incoming file;
cleaning the incoming file;
preventing the incoming file from executing on the target computer; and
quarantining the incoming file.

13. The computer program product of claim 12 further comprising:
program code for, responsive to determining that the incoming file is infected with a polymorphic worm, quarantining the incoming file; and
program code for providing identifying information concerning the quarantined file to anti-malicious code software for further processing.

14. The computer program product of claim 8 wherein it is determined that the incoming file is infected with a worm in response to at least one circumstance from a group of circumstances consisting of:
substantially the same file being written to the target computer by a requisite plurality of source computers;
substantially the same file being written to the target computer a requisite number of times by a same source computer;
substantially the same file being written to the target computer a requisite number of times within a requisite time period;
substantially the same file being written to the target computer through a requisite number of open shares; and
the incoming file exhibiting at least one substantially same suspicious characteristic as at least one other file previously written to the target computer through the at least one open share.

15. A computer system for detecting a computer worm being written to a target computer, the computer system comprising:
a software portion configured to monitor, by the target computer, files written to the target computer by a source computer through at least one open share providing the source computer with write access to the target computer; and
a software portion configured to determine, by the target computer, that an incoming file written to the target computer by the source computer through the at least one open share is infected with a worm, responsive to the incoming file being similar to a file previously written to the target computer.

16. The computer system of claim 15 further comprising:
a software portion configured to, responsive to determining that the incoming file is infected with a worm, perform a step from a group of steps consisting of:
deleting the incoming file;
cleaning the incoming file;
preventing the incoming file from executing on the target computer; and
quarantining the incoming file.

17. The computer system of claim 16 further comprising:
a software portion configured to quarantine the incoming file, responsive to determining that the incoming file is infected with a worm; and
a software portion configured to provide identifying information concerning the quarantined file to anti-malicious code software for further processing.

18. The computer system of claim 15 further comprising:
a software portion configured to perform a binary heuristic analysis on the incoming file; and
a software portion configured to determine that the incoming file is infected with a polymorphic worm, responsive to the incoming file exhibiting at least one substantially same suspicious characteristic as at least one other file previously written to the target computer through the at least one open share.

19. The computer system of claim 18 further comprising:
a software portion configured to, responsive to determining that the incoming file is infected with a polymorphic worm, perform a step from a group of steps consisting of:
deleting the incoming file;
cleaning the incoming file;
preventing the incoming file from executing on the target computer; and
quarantining the incoming file.

20. The computer system of claim 19 further comprising:
a software portion configured to quarantine the incoming file, responsive to determining that the incoming file is infected with a polymorphic worm; and
a software portion configured to provide identifying information concerning the quarantined file to anti-malicious code software for further processing.

21. The computer system of claim 15 wherein it is determined that the incoming file is infected with a worm in response to at least one circumstance from a group of circumstances consisting of:
substantially the same file being written to the target computer by a requisite plurality of source computers;
substantially the same file being written to the target computer a requisite number of times by a same source computer;
substantially the same file being written to the target computer a requisite number of times within a requisite time period;
substantially the same file being written to the target computer through a requisite number of open shares; and
the incoming file exhibiting at least one substantially same suspicious characteristic as at least one other file previously written to the target computer through the at least one open share.

22. A computer system for detecting a computer worm being written to a target computer, the computer system comprising:
means for monitoring, by the target computer, files written to the target computer by a source computer through at least one open share providing the source computer with write access to the target computer; and
means for determining, by the target computer, that an incoming file written to the target computer by the source computer through the at least one open share is infected with a worm, responsive to the incoming file being similar to a file previously written to the target computer.

23. The computer system of claim 22 further comprising:
means for, responsive to determining that the incoming file is infected with a worm, performing a step from a group of steps consisting of:
- deleting the incoming file;
- cleaning the incoming file;
- preventing the incoming file from executing on the target computer; and
- quarantining the incoming file.

24. The computer system of claim 22 wherein it is determined that the incoming file is infected with a worm in response to at least one circumstance from a group of circumstances consisting of:

- substantially the same file being written to the target computer by a requisite plurality of source computers;
- substantially the same file being written to the target computer a requisite number of times by a same source computer;
- substantially the same file being written to the target computer a requisite number of times within a requisite time period;
- substantially the same file being written to the target computer through a requisite number of open shares; and
- the incoming file exhibiting at least one substantially same suspicious characteristic as at least one other file previously written to the target computer through the at least one open share.

* * * * *